Nov. 18, 1924.  
J. R. AYOTTE  
1,515,717
AUTOMOBILE RUNNING BOARD FOOTLIGHT
Filed Oct. 11, 1923
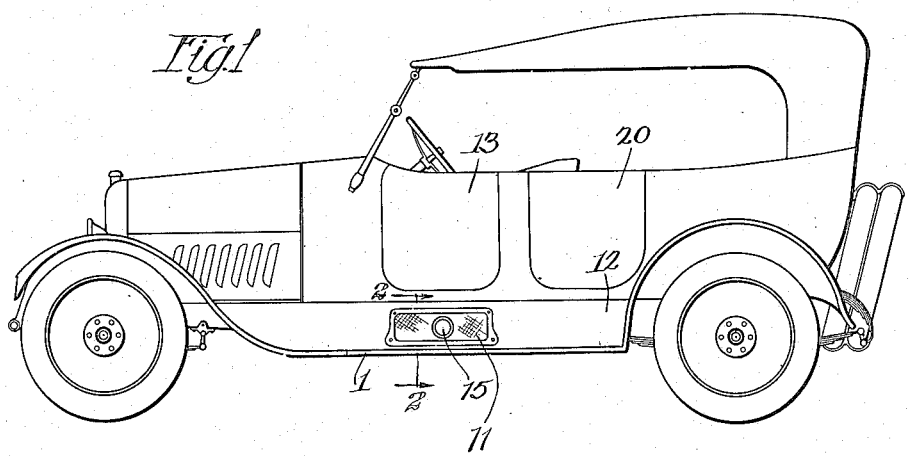
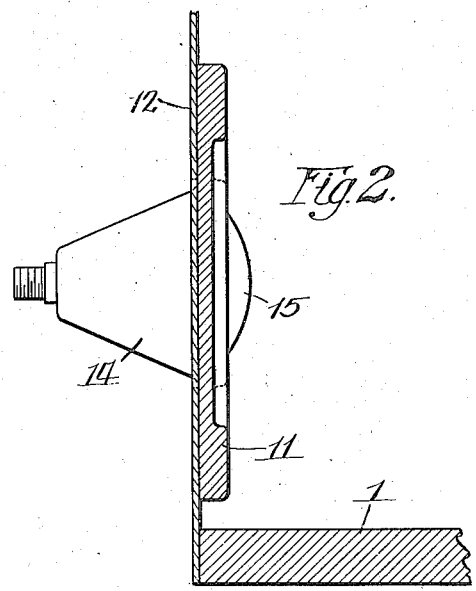
Inventor  
Joseph René Ayotte  
by Arthur F. Durand Atty.

Patented Nov. 18, 1924.

1,515,717

UNITED STATES PATENT OFFICE.

JOSEPH RENÉ AYOTTE, OF CHICAGO, ILLINOIS, ASSIGNOR TO LIBERTY PRODUCTS MANUFACTURING COMPANY, A CORPORATION OF ILLINOIS.

AUTOMOBILE RUNNING-BOARD FOOTLIGHT.

Application filed October 11, 1923. Serial No. 667,852.

*To all whom it may concern:*

Be it known that I, JOSEPH RENÉ AYOTTE, a citizen of the Dominion of Canada (who have applied for citizenship in the United States), and resident of Chicago, Cook County, Illinois, have invented a certain new and useful Improvement in Automobile Running-Board Footlights, of which the following is a specification.

This invention relates to electric lights for automobiles, and more particularly to those which are used as footlights for the running board, in some convenient position adjacent thereto, so that a person in entering the automobile at night can see where to step, and so that the light will be directed outward from the side of the car for the benefit of drivers in other automobiles.

Generally stated, the object of the invention is to provide an improved construction and arrangement whereby the light forms a part of the kick-plate on the skirt of the automobile chassis, so that the light is a part of the element or member or means to be actually engaged by the foot, thus ensuring more satisfactory results than heretofore, and whereby the device has the double function of being a kick-plate and a lamp, as will hereinafter more fully appear.

To these and other useful ends the invention consists in matters hereinafter set forth and claimed and shown in the accompanying drawings in which—

Figure 1 is a side elevation of an automobile equipped with running board footlights embodying the principles of the invention.

Figure 2 is an enlarged vertical section on line 2—2 in Figure 1.

As thus illustrated, the invention comprises what is ordinarily known as a kick-plate 11 secured to the skirt 12 of the chassis of the car, directly below the door 13 of the body, in such position that the toe of the person entering the car will kick the plate, which latter may be faced with rubber or other material. This kick-plate has a rear enlargement 14 like the tapered enlargement or body portion 4 previously described, and contains an electric lamp bulb, similar to the one shown in Figure 2, and has a glass front plate or lens 15 to cover the lamp. The enlargement 14, as shown in Fig. 2, extends through the skirt 12 of the car. Thus in this case, as previously stated, the lamp is actually in or on and forms a part of the means to be actually engaged by the foot of the person entering the car, and it is the location of the lamp itself, and not merely the light therefrom, which shows the location of the thing to be engaged by the foot, and which shows where the person must step to enter the car.

The invention is not limited to the exact construction shown and described, of course, for it is obvious that an electric lamp bulb can be made a part of any suitable means for engaging the foot of the person entering the car, and can be combined therewith in any suitable or desired manner, without departing from the spirit of the invention.

It will be seen that the tapered hollow portion in which the electric bulb is enclosed, extends inwardly, out of the way, so that the top of the running board is left clear and free from obstruction by the attachment. Thus the kick-plate, which is a device to be actually engaged by the foot, carries a lamp, and the lamp is entirely out of the way, and is in such position that the top of the running board is left free and clear from obstruction by the lamp and by the means for enclosing the lamp.

What I claim as my invention is—

1. In combination with an automobile or other vehicle having a running board or step for entering the vehicle, a kick-plate secured to the side of the vehicle, against the skirt of the vehicle immediately above said step, and immediately below the entrance to the car or vehicle, and an electric lamp carried by said kick-plate, so that the kick-plate and lamp form a unitary attachment for the vehicle.

2. A structure as specified in claim 1, said kick-plate having a rear hollow enlargement extending through the skirt of the car to enclose the electric lamp and having means to cover the front of the lamp.

3. A structure as specified in claim 1, said kick-plate having a hollow integral portion forming a chamber for the electric lamp.

4. A plate for an automobile or motor vehicle, attachable thereto, being adapted and designed to be attached at the side of the car to receive the impact of the foot on the running board or step in entering the car, and an electric lamp carried by said plate and forming therewith a unitary attachment to be applied to the vehicle in position to be engaged by the foot on the running board or step in entering the car.

JOSEPH RENÉ AYOTTE.